April 17, 1951   J. T. PARSONS ET AL   2,549,002
FIXTURE FOR USE IN ASSEMBLING STRUCTURAL
PARTS UPON A ROTOR BLADE SPAR
Filed June 3, 1946   4 Sheets-Sheet 1
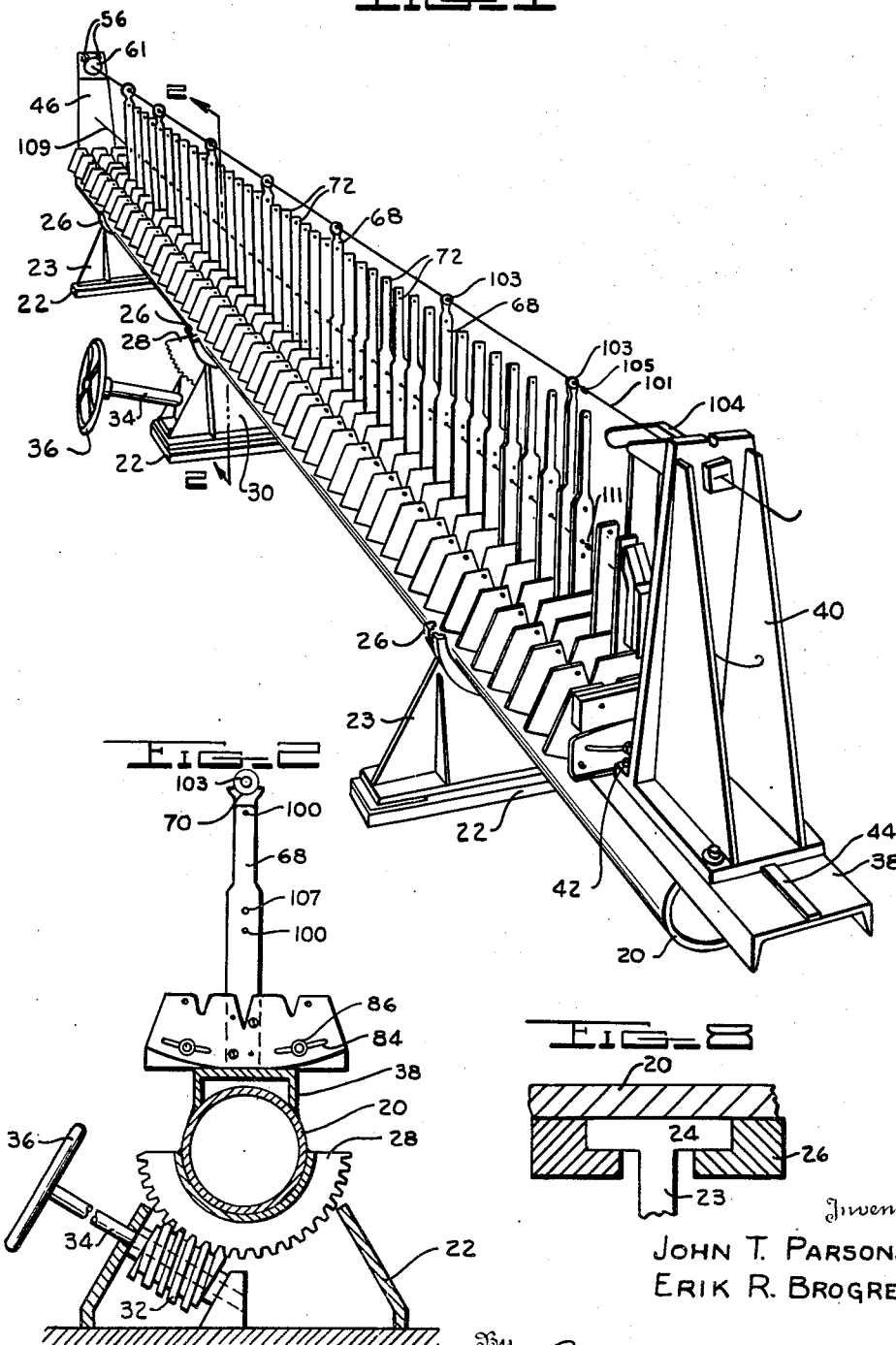
Inventor
JOHN T. PARSONS
ERIK R. BROGREN
By Parker & Burton
Attorney

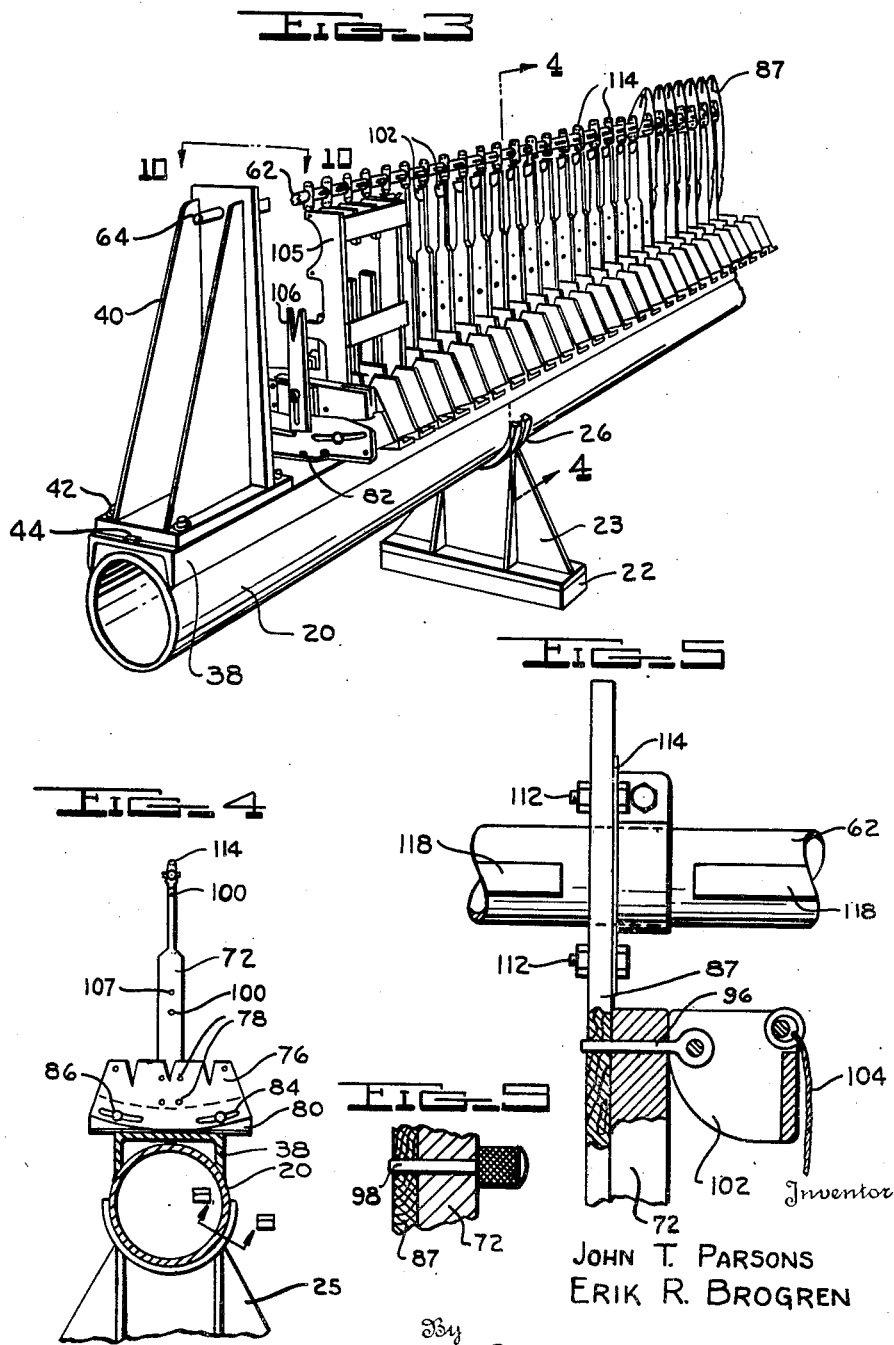

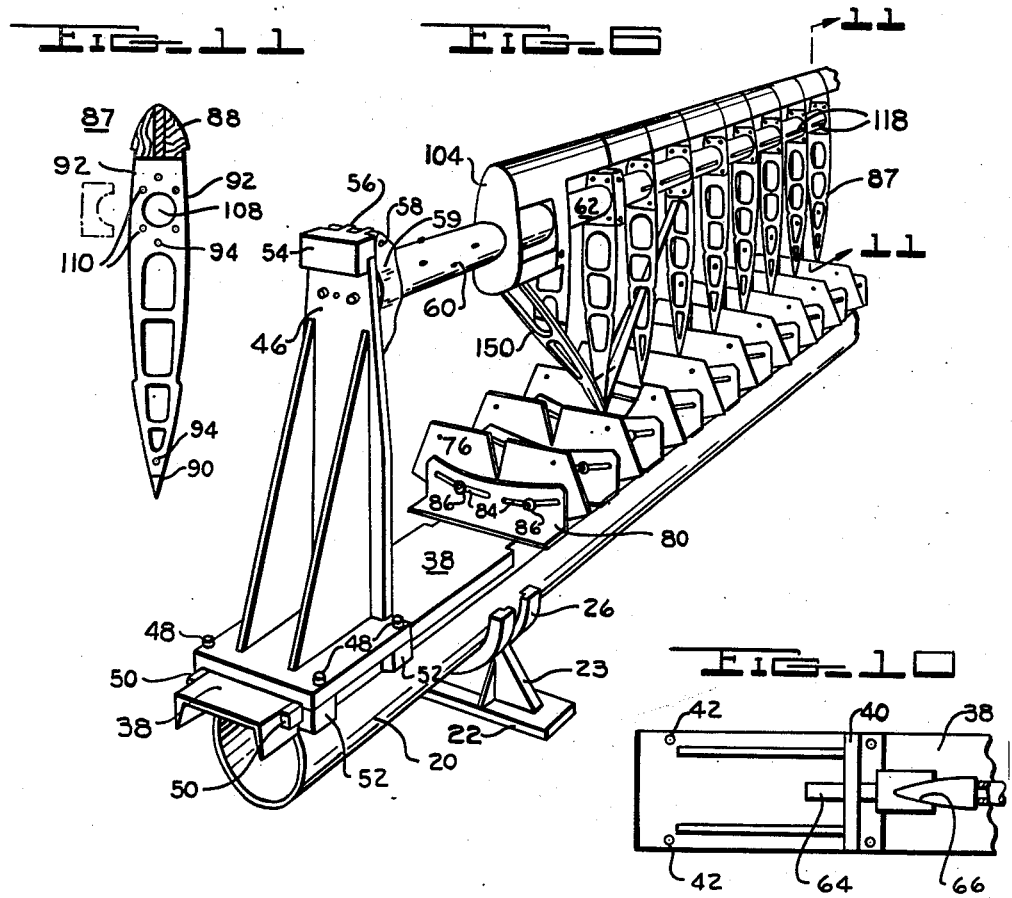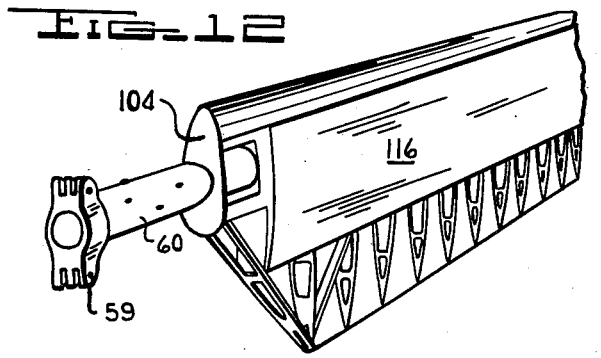

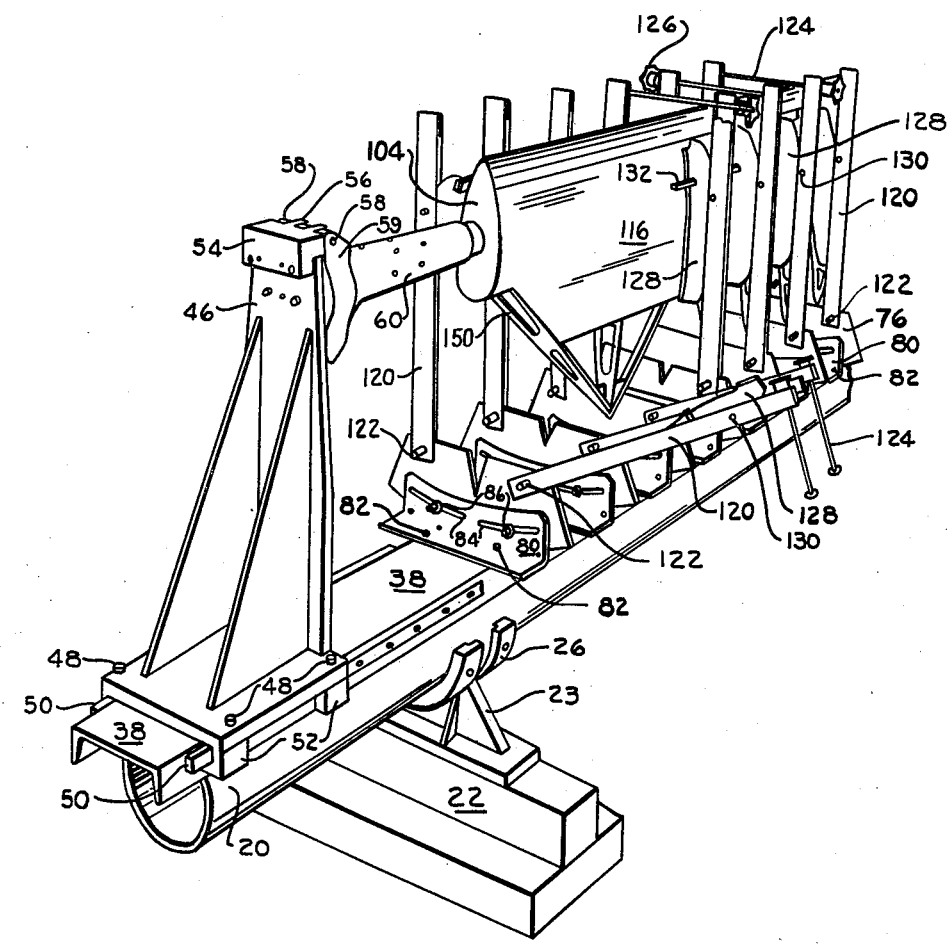

Patented Apr. 17, 1951

2,549,002

UNITED STATES PATENT OFFICE 2,549,002

FIXTURE FOR USE IN ASSEMBLING STRUCTURAL PARTS UPON A ROTOR BLADE SPAR

John T. Parsons and Erik R. Brogren, Traverse City, Mich., assignors, by mesne assignments, to Parsons Corporation, Detroit, Mich., a corporation of Michigan Application June 3, 1946, Serial No. 674,128

5 Claims. (Cl. 154—1)

This invention relates to an improved fixture for use in assembling ribs and other structural parts upon a rotor blade spar.

An object is to provide a fixture which is so constructed that it can be used to support a spar in horizontal position, and also to support a plurality of ribs normal to the spar and in a row which is parallel to the axis of the spar and in such a manner that the ribs may be readily attached to the spar.

A further object is to provide a fixture of the character described which is so constructed that it may be used to support and position the opposite ends of a rotor blade spar and also to support the spar at points intermediate its ends so that it occupies a true straight line position and further to support and position certain structural parts such as ribs, so that these structural parts may be secured to the spar at properly spaced intervals throughout the length of the spar.

A further object is to provide a fixture of the character above set forth which fixture includes a linear base member provided at opposite ends with upright standards adapted to support and position a tubular rotor blade spar disposed therebetween and which fixture also includes a plurality of spar supporting standards disposed between the end standards and in line therewith, and also in linear spaced apart relationship.

The fixture further includes a plurality of rib positioning standards carried by the base and disposed between the end standards, and in line therewith. Each of the rib positioning standards is designed to be coupled with a rib element to position the rib for securement to the tubular spar disposed between the end standards of the fixture.

An advantage of the fixture herein described is that in addition to the structure described in the immediately foregoing paragraph, it also includes a clamping device associated with individual rib supporting standards. Each clamping device comprises a pair of clamping members pivotally mounted upon the base and disposed on opposite sides of a rib supporting standard and adapted to be swung to an upright position toward such standard to hold certain structural parts against the edges of the rib positioned by the standard for securement to such rib.

Such clamping device is adapted to exert equal pressure over a wide area and over an arcuate surface. It also includes swingably mounted pressure members.

Another meritorious feature resides in the fact that the fixture herein described may be tilted about the linear axis of the base so as to position the blade structure being built on the spar at different angles with respect to the floor of the shop for convenience of working thereon.

Another meritorious feature resides in the fact that the rib positioning standards may be adjusted angularly with respect to the axis of the spar to which the ribs are to be secured to vary the shape and angle of the blade which is to be built upon the spar.

Other objects, advantages and meritorious features will more fully appear from the following specification, appended claims and accompanying drawings wherein:

Figure 1 is a perspective of the fixture embodied in this invention,

Figure 2 is a vertical sectional vew taken on the line 2—2 of Figure 1 showing one of the intermediate spar supporting standards in elevation, Figure 3 is a perspective of a portion of the fixture shown in Figure 1, Figure 4 is a vertical sectional view taken on the line 4—4 of Figure 3 showing one of the rib supporting standards in elevation, Figure 5 is an elevation, partly in section, taken at right angles to the view of Figure 4 of one of the rib supporting standards and a rib supported thereon, Figure 6 is a perspective of a fragment of the fixture showing a fragment of a spar thereon and rib elements and other structural parts supported thereon, Figure 7 is a perspective taken from the same angle as Figure 6 and showing clamping mechanism adapted to hold certain structural parts up against the rib elements mounted upon the spar, Figure 8 is a section taken on line 8—8 of Figure 4 through a part of the base, Figure 9 is a vertical section taken on the same line as a part of Figure 5 and showing a part of a rib positioning standard and a rib positioned thereon at a point below the point shown in Figure 5, Figure 10 is a plan of an end fragment of the fixture taken on the line 10—10 of Figure 3, Figure 11 is a plan of one of the rib elements adapted to be mounted upon the spar, showing in dotted outline the lock block withdrawn from the major portion of the rib, Figure 12 is a perspective of a fragment of the rotor blade in a partially completed state.

In the drawings, a tubular base element 20 is shown as supported at spaced points throughout its length upon a plurality of upright pedestals 22. Each of these pedestals exhibits an arcuate cradle portion which engages the tubular base member 20 and supports the same for adjustable oscillation about its linear axis.

In the case of the end pedestals 22 shown in the several figures of the drawing there is an upright web 23 which terminates, as shown in Figure 8, in an arcuate T-shaped face plate 24 that directly supports the tube 20 for rotatable oscillation thereover. A pair of arcuate retaining flange elements 26 are secured to the tube 20. These flange elements overhang the edges of the T-shaped face plate 24 as shown in Figure 8 to position the tube upon the pedestals.

In the case of the intermediate pedestal 22 an arcuate gear plate 28 is welded or otherwise secured to the tube 20. This plate has a toothed outer edge as shown in Figure 2. This middle pedestal exhibits a pair of upright spaced webs 30 which are disposed on opposite sides of the arcuate sector blade 28 so that same is rotatable therebetween. A worm 32 is carried by a rotatable shaft 34 which shaft is rotatably supported upon the middle pedestal and is provided with a hand wheel 36 so that the shaft may be rotated to actuate the sector blade to oscillate the base tube 20 about its longitudinal axis, as is apparent from the drawings.

A channel-shaped base plate 38 is secured in inverted position upon the tubular base 20. The plate 38 extends lengthwise along the tube. A pair of upright end standards are shown as secured to opposite ends of this base plate 38. One end standard is indicated as 40 and may be secured by screws 42 to the base plate. This base plate may have slots through which the screws 42 extend so that the standards may be adjusted lengthwise over the base plate. A spline 44 is shown as provided on the upper surface of the base plate to travel in a corresponding guide way in the bottom of the standard to guide this adjustment of the standard. This construction is shown in Figures 1 and 3.

This standard 40 is the one that is adapted to position the small end of the spar when mounted on the fixture. At the opposite end of the base plate 38 there is provided an upright standard 46. In this case, the base plate is shown as provided with side rails 50 secured to opposite sides of the plate. This standard is provided with depending guides 52 held to the base of the standard by screws 48 and these guides engage over the guide rails 50 to guide the adjustment of the standard. Such adjustment of the standard over the side rails is obvious from the drawings. This is an alternative construction as compared with the construction described in the immediately preceding paragraph.

This standard 46 is adapted to support and position the large end of the spar which is disposed between the standards as shown particularly in Figures 6 and 7. There is a block 54 suitably secured to the top of the standard and this block exhibits a pair of spaced apart ears 56 which are apertured to receive a mounting pin 58 which pin extends through the standard and through a portion 59 of a cuff 60 which cuff is mounted on the large end of the spar by being secured thereon by pins, welding or in any other suitable manner. A circular positioning block 61 shown in Figure 1 is provided on the inner face of the standard 46 to be received within the open end of the cuff 60. In this way the large end of the spar is supported from and positioned by the standard 46.

The spar extends between the standards 40 and 46. The small end of the spar terminates adjacent to the standard 40. There is a part 64 carried by the standard 40 which part 64 exhibits a notch 66 as shown in Figure 10 which notch is adapted to receive the blade tip 63 which is mounted on the small end of the spar to position same between the two end standards, all as shown in Figure 10.

Disposed between the end standards 40 and 46 are a plurality of upright spar supporting standards 68. These standards are spaced apart linearly of the fixture and are arranged in line with the standards 40 and 46. Each of these upright standards 68 is provided with an arcuate upper face 70, shown particularly in Figures 1 and 2, which face is adapted to partially embrace the spar 62 and forms a seat for the spar. These standards are mounted as hereinafter described upon the base plate 38. These spar supporting standards 68 also serve as rib supporting standards.

A plurality of upright rib positioning standards 72 are provided. These rib positioning standards are spaced apart linearly of the spar. They are arranged in line between the end standards 40 and 46. They are interposed between the upright spar supporting standards 68 as shown particularly in Figure 1. The rib supporting standards terminate below the upper ends of the spar supporting standards as shown. Each rib supporting standard 72 is shown as mounted upon the base plate 38 as hereinafter described.

Preferably the mounting of the rib supporting standards 72 and the spar supporting standards 68 is so accomplished that the standards can be adjustably swung about the axis of the spar. This is here shown as being accomplished by providing a base plate 76 for each standard, to which plate the standard is fixed by pins 78 or the like. This base plate 76 is in turn mounted upon a flanged plate 80 which flanged plate 80 is secured by screw studs 82 or the like, to the linear base plate 38. The flanged plate 80 is provided with arcuate slots 84 which are arcs of a circle the center of which is the axial line of the spar when supported between the end standards and upon the spar standards 68 as shown in Figures 6 and 7. Each plate 76 which carries an upright rib supporting standard 72 or a spar supporting as well as rib supporting standard 68 is secured by bolts 86 or the like to a flange plate 80. The bolts 86 are carried by the base plate 76 and they extend through the arcuate slots 84 in the flange plate 80 as shown in the drawings.

Due to this method of supporting the upright standards 72 it is apparent that each standard may be oscillated to swing through an arc about an axis which coincides with the axis of the spar 62. Due to this arrangement the rib supports can be shifted angularly so that the blade built upon the spar can exhibit a twist throughout its length as may be desired.

Before the spar is positioned upon the fixture an aligning wire 101 is stretched between the end standards along the line of the spar which will be mounted thereon to align the spar supporting standards 68. Upon this wire are disposed disks 103 which disks are shaped to seat within the curved seats of standards 68. Mounted slidably upon the wire 101 is a circular bead 105 adapted to be freely slidable through each disk 103 when the wire passes axially through the disk. If the bead is not thus freely slidable through a disk the wire does not extend axially therethrough and the support for such disk is out of line. To line up all the supports and particularly the support 72, each support is provided with an aligning aperture 107. A wire 109 extends between the end standards through these apertures 107. A bead 111 is mounted slidably upon this wire 109 for movement thereover through the aperture 107. Free movement through the several apertures is the test.

In Figure 11 there is shown a conventional rib structure indicated in such figure as having a leading portion 88 and a trailing portion 90. This rib is recessed upon its opposite edges as at 92 to receive within such recess a blade skin sheet 116. This rib element generally indicated as 87 is provided with apertures 94 adapted to receive locating pins 96 and 98 shown in Figures 5 and 9 respectively. These pins position the rib element upon either an upright standard 72 or standard 68. These standards 68 and 72 are provided as shown with apertures 100 which apertures are adapted to register with the apertures 94 through the rib to receive the positioning pins 96 and 98. Each positioning pin is frictionally held within its upright standard.

The positioning pin 96 which is adapted to be received through the uppermost aperture is pivoted to a cam plate 102 and a pull cord 104 is connected to said cam plate so that as the cam plate is oscillated the pin 96 will be withdrawn to release the rib from the upright. This method of releasing is provided because this particular pin is not conveniently accessible for release after the outer skin sheet is mounted upon the ribs as hereinafter described. The uprights 68 are provided with similar apertures 100 and similarly serve as positioning standards for rib elements 87. Such uprights 68 are supported upon the base plate in the same manner as the uprights 72 as hereinabove described.

Due to the fact that the blade built on the spar 62 is provided with a diagonal brace member 150 at its large end and a root fairing 104 adjacent thereto, it is not practicable to provide upright standards 68 for the ribs all the way along to the large end of the spar and certain of these upright standards are omitted as is apparent from Figures 6 and 7. The blade built on the spar also exhibits a tip portion at its smaller end which is so shaped as to render it impractical to provide the rib standards 72 all the way to the small end of the spar. As shown in Figure 3, an upright rib positioning structure 105 and a notched upright 106 are provided at the large spar end of the fixture in lieu of these rib supporting standards 72.

The rib element 87, one of which is shown in Figure 11, is provided with an aperture 108 adapted to be received over the spar 62. It is also provided with a plurality of apertures 110 adapted to receive rib securing bolts 112. These bolts extend through the apertures provided in the collar members 114 which collars are mounted upon spar 62. These collars are fastened upon the spar 62 in linearly spaced apart positions before the spar is mounted upon this fixture. These collars determine the position of the rib elements upon the spar. The aperture 108 of the rib element is sufficiently oversize the spar so that the rib element may be adjusted to register apertures 110 with the corresponding apertures through the collars 114.

After the rib elements 87 have all been secured to the spar a skin section 116, which is in the form of a thin sheet of material of the required length, is placed against the several rib elements and mounted within the edge recesses 92. The edges of the ribs within these recesses are coated with adhesive and corresponding points of the skin section are similarly coated. A skin sheet is clamped, one upon each side, against the ribs by suitable clamping devices. These clamping devices also hold the skin sheet 116 against adhesively coated intercostals 118 which are shown in Figures 5 and 6 as secured to the spar 62. These intercostals as well as the collars are secured to the spar before it is placed in this fixture.

This clamping mechanism comprises upright swingable sections 120. Each base plate 76 has a pair of swingable upright sections 120 pivotally supported thereon by mounting pins 122, as shown particularly in Figure 7. These sections 120 are adapted to be connected and drawn together at their upper ends by an adjusting rod 124. This rod is provided with an adjustable hand wheel 126 mounted on one end and operable as shown in Figure 7 to draw the two upper ends of the swingable sections 120 toward each other.

Each upright section 120 supports an arcuate face plate 128 pivotally mounted thereon by means of a mounting pin 130. This face plate 128 carries a pressure pad 132 which extends transversely of the face plate as shown in Figure 7. The arcuate edge of the face plate is adapted to engage the skin sheet 116 and hold it with equal pressure at all points throughout its width against the arcuate edge of the recess 92 in the edge of a rib.

The cross piece pad 132 is adapted to urge that portion of the skin sheet 116 that overlies an intercostal block 118 securely against such block to achieve its securement thereto.

In the drawings, the blade is shown as being built upon the spar on a straight line. It is apparent that as hereinabove described the blade supporting standards might be swung so as to provide a blade with a predetermined twist in its length. The blade is not shown as completed. Additional skin laminations would be adhesively fastened thereto. The fixture is primarily provided for the purpose of carrying the work of fabrication to the point illustrated in the drawings.

We claim:

1. A fixture for use in the mounting of ribs upon a rotor blade spar comprising a linear base member provided at opposite ends with upright end standards having opposed complementary spar engaging means adapted to engage opposite ends of a rotor blade spar and support said spar on an axial spar line between said standards, a plurality of upright spar supporting standards carried by the base and disposed between and spaced apart and in line with said end standards, a plurality of upright rib positioning standards disposed between and in line with said end standards, each rib positioning standard provided with two rib locating pins adapted to position a rib upon the standard, one of said locating pins extending through the standard spaced from the bottom thereof and provided with releasing means extending therefrom to a point adjacent to the bottom of the standard and means mounting each of said rib positioning standards upon the base for swingable adjustment of its lower end through an arc circumferentially about the axial spar line between the end standards, said base member being adjustably rotatable about its linear axis to swing therewith.

2. A fixture for use in the mounting of ribs upon a rotor blade spar comprising a linear base member supported for rotatable adjustment about its linear axis, said base member provided at opposite ends with upright end standards having complementary spar engaging means adapted to engage opposite ends of a rotor blade spar and to support the spar on an axial spar line between said standards disposed parallel to the axial line of the base, a plurality of upright spar supporting standards carried by the base to rotate therewith and disposed between and spaced apart and in line with said end standards, a plurality of upright rib positioning standards disposed between and in line with said end standards, said spar supporting standards projecting upwardly to a greater height than the rib positioning standards and having arcuate spar engaging upper faces, and means mounting each of said rib positioning standards upon the base for swingable adjustment of such standard to a plurality of radial positions with respect to said axial spar line between the end standards.

3. A fixture for use in the mounting of ribs upon a rotor blade spar comprising a linear base member provided at opposite ends with upright end standards having opposed spar engaging means adapted to engage opposite ends of a rotor blade spar to support the spar on a line extending between said standards, a plurality of upright spar supporting standards carried by the base and disposed between and spaced apart and in line with said end standards, and having upper ends shaped to engage the spar, a plurality of upright rib positioning standards disposed between and in line with said end standards, said spar supporting standards projecting upwardly to a greater height than the rib positioning standards, a clamping device associated with each rib positioning standard, each clamping device including a pair of upright clamping members pivoted to the base and swingable upwardly therefrom toward opposite edges of the rib positioning standard and adjustable toward or away from said standard, each upright clamping member of each clamping device provided with a face plate pivoted to and projecting toward the rib supporting standard and swingable angularly with respect thereto, means to secure the upper ends of said clamping members together, means securing each rib positioning standard to the base for swingable adjustment of said standard to a plurality of positions radially with respect to line of support of the spar between the end standards.

4. A fixture for use in the mounting of ribs upon a rotor blade spar comprising a linear base supported for rotatable adjustment about its linear axis, upright end standards mounted upon opposite ends of the base for swingable rotatable adjustment therewith, said standards provided with opposed complementary spar supports disposed on a line parallel to the axial line of the base and adapted to engage opposite ends of a spar to support the same therebetween, upright intermediate spar supports carried by the base to swingably rotate therewith, said spar supports disposed spaced apart linearly of the base between and in line with the end standards and provided with spar seating upper ends aligned to engage the spar supported between the spar supports, and a plurality of upright spaced apart rib supporting standards carried by the base to rotate therewith and disposed spaced between said end and spar supporting standards and in line therewith and being of a height lower than the spar supporting standards.

5. A fixture for use in the mounting of ribs upon a rotor blade spar comprising a linear base member provided at opposite ends with upright end standards having opposed complementary means adapted to engage opposite ends of a rotor blade spar to support the same therebetween, a plurality of upright rib positioning standards carried by the base to swingably rotate therewith, said standards disposed between and in line with the end standards, and means mounting certain rib positioning standards on the base for independent swingable adjustment about the axis of a spar disposed between the spar engaging means on said end standards.

JOHN T. PARSONS.
ERIK R. BROGREN.

REFERENCES CITED

The following references are of record in the file of this patent:

UNITED STATES PATENTS

| Number | Name | Date |
|---|---|---|
| 169,334 | Bartlett | Nov. 2, 1875 |
| 929,045 | Stewart | July 27, 1909 |
| 1,303,596 | Rifflard | May 13, 1919 |
| 1,585,490 | Hainsworth | May 18, 1926 |
| 1,618,536 | Junkers | Feb. 22, 1927 |
| 1,822,270 | Bunch | Sept. 8, 1931 |
| 2,185,322 | Anderson | Jan. 2, 1940 |
| 2,370,083 | Smith | Feb. 20, 1945 |
| 2,417,226 | Weyant | Mar. 11, 1947 |

OTHER REFERENCES

Pyler: "Unleashing the Thunderbolt," American Machinist, Oct. 15, 1942, pages 1173–1188.